United States Patent
Post et al.

(10) Patent No.: US 10,630,948 B2
(45) Date of Patent: Apr. 21, 2020

(54) DEVICE, SYSTEM AND METHOD FOR PHOTOMETRIC COMPENSATION OF IMAGES PROVIDED BY A DISPLAY DEVICE

(71) Applicant: CHRISTIE DIGITAL SYSTEMS USA, INC., Cypress, CA (US)

(72) Inventors: Matthew Post, Brampton (CA); Mark Lamm, Mississauga (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 16/142,781

(22) Filed: Sep. 26, 2018

(65) Prior Publication Data

US 2020/0099905 A1  Mar. 26, 2020

(51) Int. Cl.
H04N 9/31 (2006.01)

(52) U.S. Cl.
CPC ......... *H04N 9/3182* (2013.01); *H04N 9/3194* (2013.01)

(58) Field of Classification Search
None
See application file for complete search history.

(56) References Cited

U.S. PATENT DOCUMENTS

| | | | |
|---|---|---|---|
| 5,754,184 A | 5/1998 | Ring et al. | |
| 7,663,640 B2 | 2/2010 | Nayar et al. | |
| 7,737,989 B2 | 6/2010 | Pettitt et al. | |
| 9,794,450 B2 | 10/2017 | Kobiki et al. | |
| 2005/0134599 A1* | 6/2005 | Nayar | G06T 3/00 345/589 |
| 2014/0320827 A1* | 10/2014 | Grundhofer | H04N 9/3182 353/69 |
| 2015/0085162 A1 | 3/2015 | Huang et al. | |
| 2016/0189673 A1 | 6/2016 | Naccari et al. | |
| 2019/0228737 A1* | 7/2019 | Lin | G01J 3/506 |

OTHER PUBLICATIONS

Tamburrino et al. (Digital camera workflow for high dynamic range images using a model of retinal processing, Digital Photography IV, Proc. of SPIE-IS&T Electronic Imaging, SPIE vol. 6817, 2008) (Year: 2008).*

* cited by examiner

*Primary Examiner* — Kyle Zhai
(74) *Attorney, Agent, or Firm* — Perry + Currier, Inc.

(57) ABSTRACT

A device, system and method for photometric compensation of images provided by a display device. A display device is controlled to provide colors, the display device configured to provide images according to the colors of the display device. A camera acquires respective images of the colors provided by the display device. A per-pixel correction function for modifying image data used by the display device to provide the images is determined based on: the respective images of each of the colors acquired by the camera corrected into the HVS model using a predetermined color-relationship between the camera and a Human Visual System (HVS) model for the colors of the display device. The display device is controlled to provide the images using the image data as corrected using the per-pixel correction function.

17 Claims, 10 Drawing Sheets

DEVICE, SYSTEM AND METHOD FOR PHOTOMETRIC COMPENSATION OF IMAGES PROVIDED BY A DISPLAY DEVICE

BACKGROUND

Existing camera-based projection-surface color correction methods perform radiometric compensation by correcting the output of a projector to a camera's color sensitivity, adjusting a projected image until it appears "correct" only from the perspective of the camera, the camera arranged to capture projected images.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

An aspect of the specification provides a device comprising: a controller in communication with: a display device configured to provide images according to colors of the display device; and a camera arranged to detect one or more of the images and the colors provided by the display device; and a memory storing: a predetermined color-relationship between the camera and a human visual system (HVS) model for the colors of the display device, the controller configured to: control the display device to provide the colors; control the camera to acquire respective images of the colors provided by the display device; determine a per-pixel correction function for modifying image data used by the display device to provide the images, based on: the respective images of each of the colors acquired by the camera corrected into the HVS model using the predetermined color-relationship between the camera and the HVS model for the colors of the display device; and control the display device to provide the images using the image data as corrected using the per-pixel correction function.

An aspect of the specification provides a method comprising: controlling, using a controller, a display device to provide colors, the display device configured to provide images according to the colors of the display device; controlling, using the controller, the camera arranged to acquire respective images of the colors provided by the display device;

determining, using the controller, a per-pixel correction function for modifying image data used by the display device to provide the images, based on: the respective images of each of the colors acquired by the camera corrected into the HVS model using a predetermined color-relationship between the camera and a Human Visual System (HVS) model for the colors of the display device, the controller in communication with a memory storing the predetermined color-relationship; and controlling, using the controller, the display device to provide the images using the image data as corrected using the per-pixel correction function.

Figure 1:
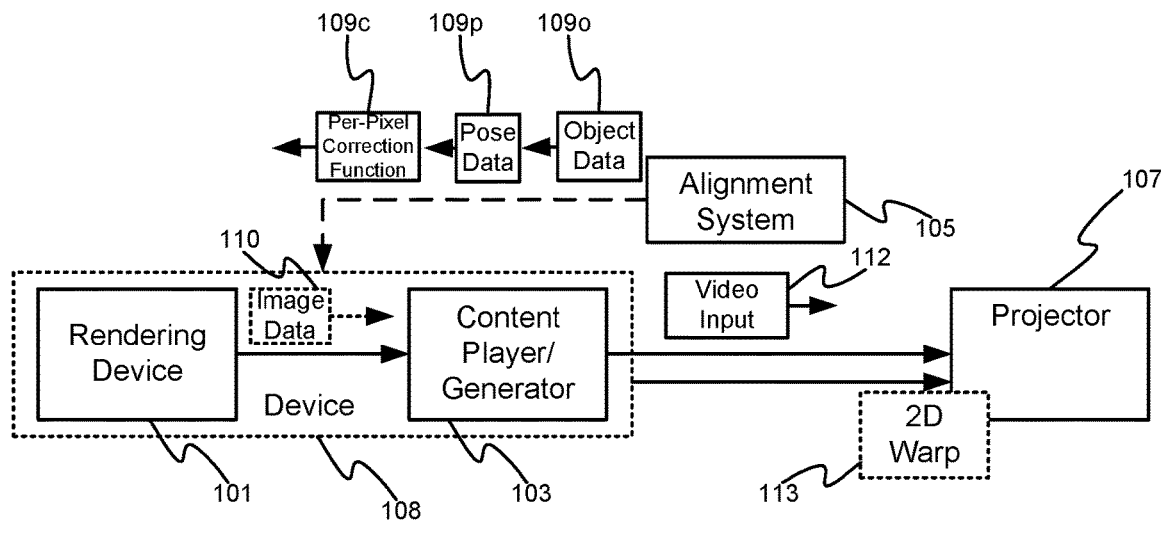
FIG. 1 depicts a projection system, according to non-limiting examples.

FIG. 1 depicts a system 100 comprising: a rendering device 101; a content player 103 (and/or content generator); an alignment system 105; and a projector 107. In general, the rendering device 101 is in communication with the content player 103, and optionally the alignment system 105, and the content player 103 is in communication with the projector 107.

As depicted, the rendering device 101 and the content player 103 are combined into one device 108, however in other implementations the rendering device 101 and the content player 103 can be separate devices. The alignment system 105 is configured to generate pose data 109p comprising at least data defining geometric relationships between, for example, the projector 107 and objects and/or surfaces onto which the projector 107 projects (presuming such surfaces have three-dimensional features). Generally, the pose data 109p comprises a location of the projector 107 (e.g. in "x,y,z" coordinates relative to the object and/or surface) and an orientation of the projector 107 (e.g. a "yaw", a "pitch" and a "roll" relative to the object and/or surface). However, the pose data 109p may also comprise intrinsic properties of the projector 107, such as lens characteristics, and the like.

Hereafter, while projection onto a "surface" is described, it is understood that such projection includes projection onto an object, including, but not limited to, a three-dimensional object.

The rendering device 101 can generate rendered image data 110, for example by rendering existing image data (not depicted) for projection by the projector 107. The image data 110 may generally comprise two-dimensional images, with each pixel color specified in a given color space, such as an sRGB (standard Red Green Blue) color space as known to persons of skill in the art. However, the projector 107 may project and/or provide images according to colors in a color space different from the color space of the image data 110; for example, red, green and blue light sources of the projector 107 may have color coordinates different from that of the sRGB color space. Furthermore, the color of a surface onto which the projector 107 is projecting may not be white and/or the surface may be multicolored. Either way, colors of images as projected by the projector onto the surface, as viewed according to a Human Visual System (HVS) model (e.g. by a human observer and/or a device configured to operate according to the HVS model) at the surface, will be different from the colors specified by the sRGB colors (and the like) of the two-dimensional images of the image data 110.

Hence, as depicted, the alignment system 105 further generates a per-pixel correction function 109c which may be used to correct the color of images projected by the projector 107 onto a surface such that the projected images, as viewed according to the HVS model at the surface, have the same (and/or similar) colors as the original two-dimensional images of the image data 110.

Hence, the content player 103 combines the image data 110 with the per-pixel correction function 109c, the pose data 109p (and optionally the object data 109o) received by the alignment system 105 to produce video input 112, which comprises the color corrected image data 110 altered for a perspective for projection on an object by the projector 107. In FIG. 1, solid lines connecting components show flow of image and/or video data there between, while the stippled line connecting the alignment system 105 to the rendering device 101 and/or the device 108 shows flow of the per-pixel correction function 109c, the pose data 109p and the object data 109o there between. The object data 109o, when present, may generally comprise a model of a location and orientation of the object onto which images from the projector 107 are projected, and can be provided with the object and/or determined by the alignment system 105 using one or more cameras.

When the rendering device 101 and the content player 103 are separate, the rendering device 101 communicates the image data 110 to the content player 103, which processes and/or "plays" the image data 110 by producing the video input 112 suitable for processing and projection by the projector 107. For example, the image data 110 can include, but is not limited to, an AVI file, a series of JPG files, a PNG file, and the like, with colors of pixels in such files specified according to the sRGB color space, and the like. The video input 112 can include, but is not limited to, High-Definition Multimedia Interface (HDMI) data, Digital Visual Interface (DVI) data, DisplayPort (DP) data, Video over Internet Protocol (IP) data, Video Graphics Array (VGA) data, and/or video transport data.

When the rendering device 101 and the content player 103 are combined in device 108, device 108 can render the video input 112 (e.g. video data) in real-time without producing the image data 110. In any event, the video input 112 is communicated to the projector 107 by the content player 103 where the video input 112 is used to control the projector 107 to project images based thereupon, for example onto a surface (e.g. of a three-dimensional object). The video input 112 may comprise images for projection onto surface, for example the image data 110 altered for the perspective of the projector 107 relative to a surface of a three-dimensional object, as determined using the pose data 109p and/or the object data 109o, and color corrected using the per-pixel correction function 109c; however the video input 112 may further comprise the pose data 109p, extrinsic properties of the projector 107, settings for the projector, and the like.

The rendering device 101 generally comprises an image generator and/or a renderer, for example a computing device, a server and the like, configured to generate and/or render images as the image data 110, for example in the sRGB color space. Such image data 110 can include, but is not limited to, still images, video and the like. Furthermore, though not depicted, the rendering device 101 can be in communication with, and/or comprise, an image generator and/or a memory storing data from which the image data 110 can be generated and/or rendered. Alternatively, the rendering device 101 can generate the image data 110 in the sRGB color space using algorithms, and the like, for generating images.

The content player 103 comprises a player configured to "play" and/or render the image data 110 according to the per-pixel correction function 109c and the pose data 109p; for example, when the image data 110 comprises video data, the content player 103 is configured to play and/or render the video data by outputting the video input 112 for projection by the projector 107. Hence, the content player 103 can include, but is not limited to a video player, a video processing device, a computing device, a server, and the like. However, as described above, when the rendering device 101 and the content player 103 are combined as device 108, rendering of the image data 110 can be eliminated and device 108 renders the video input 112 without producing the image data 110.

The alignment system 105 comprises any suitable combination of projectors (including the projector 107), cameras (not depicted in FIG. 1), and computing devices configured to automatically determine the per-pixel correction function 109c and the pose data 109p (and/or the object data 109o).

However, the alignment system 105 may, in some examples, generate the per-pixel correction function 109c without generating the pose data 109p and/or the object data 109o. For example, the pose data 109p and/or the object data 109o may have been predetermined.

Non-limiting implementations of generation of the per-pixel correction function 109c (e.g. via the alignment system 105) will be described below with reference to FIG. 2 to FIG. 10. Furthermore, while generation of the per-pixel correction function 109c is described below with reference to a projector, generation of similar correction data may occur for any type of display device that provides images according to colors of the display device, including, but not limited to projectors, displays, flat panel displays, light emitting diode (LED) displays, liquid crystal displays (LCDs) and the like. For example the image data 110 may also be used to control an LED display, and LCD display, and the like to provide images, and the color space of the pixels of the display (e.g. LEDs of an LED display) may be different from the sRGB color space, and the like, of the image data 110.

The projector 107 comprises a projector configured to project the video input 112, including but not limited to a digital projector, a cinema projector, an LCOS (Liquid Crystal on Silicon) based projector, a DMD (digital micromirror device) based projector and the like, including, but not limited to, a 1-chip DMD projector. Furthermore, while only one the projector 107 is depicted, system 100 can comprise a plurality of projectors 107, each configured to project respective projection data comprising, for example, portions of larger tiled image to be projected. Regardless of a technology used in the projector 107, it is assumed that the projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 optionally further comprises one or more 2D ("two-dimensional") warping devices and/or modules 113, for example at the projector 107 (though such a warping device can be present at the content player 103 and/or as a stand-alone device) When present, video input 112 can be warped by the warping module 113, for example by moving and/or adjusting pixels within the video input 112, to adjust the video input 112 for projection by the projector 107 onto a surface including, but not limited to, a screen, an object and the like. However, as the alignment system 105 determines the per-pixel correction function 109c and the pose data 109p, and communicates such to the rendering device 101 (and/or device 108), the warping module 113 can be unused, optional and/or eliminated from system 100. Indeed, use of the warping module 113 represents how images were processed according to the prior art and the presence of the warping module 113 may be obviated by virtue of the alignment system 105 providing the rendering device 101 (and/or device 108) with the per-pixel correction function 109c and the pose data 109p. However, in some implementations, the warping module 113 can be used to make small changes to projection of images onto a physical object, for example when a virtual model of the object used to produce the images does not precisely match the physical object.

While each of the rendering device 101, the content player 103, the alignment system 105, and the projector 107 are depicted as distinct components, in other implementations, respective portions of one or more of the rendering device 101, the content player 103, the alignment system 105, and the projector 107 and can be implemented within the same device (e.g. device 108) and/or processing resources can be shared there between including, but not limited to, in a cloud computing arrangement. For example, while not depicted, system 100 comprises one or more controllers, one or more processors, one or more memories and one or more communication interfaces, for example a controller, memory and communication interface for each of the rendering device 101, the content player 103, the alignment system 105, and the projector 107 and/or to be shared among the rendering device 101, the content player 103, the alignment system 105, and the projector 107. Indeed, in general, components of system 100, as depicted, represent different functionality of a projection system where: at least the per-pixel correction function 109c can be automatically determined. In some implementations, system 100 includes components and/or functionality for projection mapping onto three-dimensional objects and/or for updating the pose data 109p when the projector 107 moves, and/or a screen and/or object, onto which images are being projected, moves.

Figure 2:
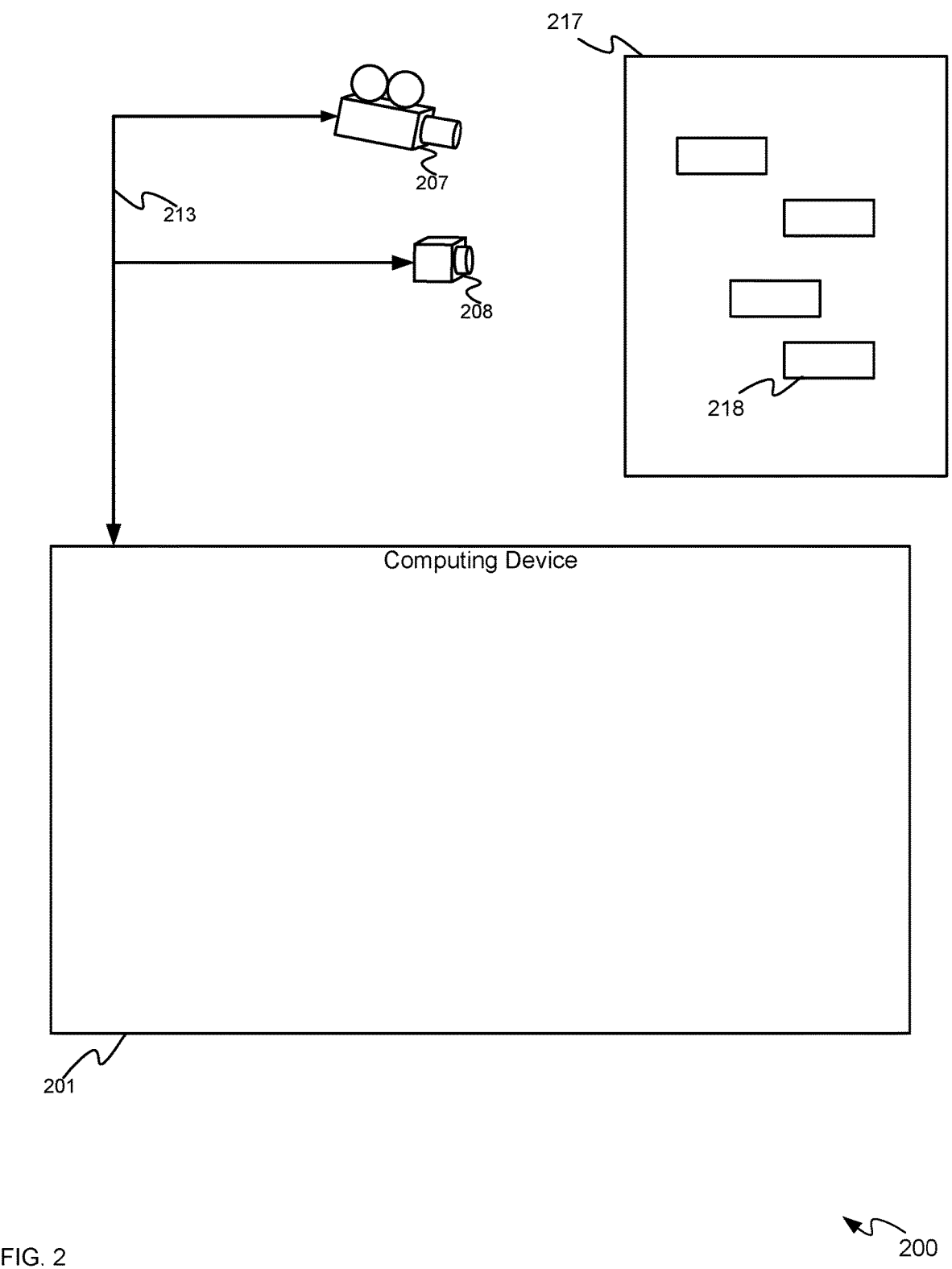
FIG. 2 depicts a system for photometric compensation of images provided by a projector, which can be used in the system of FIG. 1, according to non-limiting examples.

Attention is next directed to FIG. 2 which depicts a system 200 for photometric compensation of images provided by a display device and specifically, as depicted, a projector. The alignment system 105 can comprise the system 200, and furthermore components of the system 100 can comprise components of the system 200 as desired.

The system 200 comprises a computing device 201 (interchangeably referred to hereafter the device 201), a projector 207 and a camera 208 that are arranged relative to a surface 217 onto which images are to be projected, for example in a projection mapping "show"; as depicted the surface 217 includes non-white regions 218 of color that are of a different color from the remainder of the surface 217. Hence, in the depicted examples, the surface 217 comprises a multicolored surface, and/or a non-white surface, for example brick wall, and the like. Furthermore, the surface 217 may comprise a flat surface or a three-dimensional surface and/or any other type of object onto which images are to be projected.

In particular, the camera 208 and the projector 207 have a common field of view such that the camera 208 may detect and/or acquire and/or capture images of images projected by the projector 207 onto the surface 217. Hence, the projector 207 may be generally configured to project onto a non-white surface (e.g. the surface 217) located in the common field of view of the camera 208 and the projector 207, and the camera 208 may be generally configured to detect images projected onto the non-white surface (e.g. the surface 217) located in the common field of view. In particular, the projector 207 is configured to provide (e.g. project) images according to colors of the projector 207 which may be defined by the light sources of the projector 207. The camera 208 is arranged to detect one or more of the images and the colors provided by the projectors 207, for example as projected onto the surface 217.

While only one projector 207 and one camera 208 is depicted, the system 200 may comprise more than one projector 207 and more than one camera 208 with overlapping fields of view at the surface 217.

As depicted, computing device 201 comprises a computing device that may control the projector 207 to project structured light patterns and colors on to the surface 217, and further control the camera 208 to acquire images of structured light patterns and the colors. The computing device 201 may be a device of the alignment system 105 and/or another computing device. As depicted, the computing device 201 is in communication with the projector 207 and the camera 208 by wired and/or wireless communication links 213.

In particular, the projector 207 is configured to project images and/or color images, and may include three light sources, for example to project each of red, green and blue light, and the like, and color images are generally produced by modulating the red, green and blue light, either in parallel (e.g. assuming three image modulators, or one image modulator for each color of light) or serially (e.g. assuming one image modulator which modulates each color of light in a sequence). Hence, while not depicted, the projector 207 may comprise a red light source, a green light source and a blue light source including, but not limited to, lamps, lasers, and the like, as well as color filters, prisms and/or mirrors used to separate white light into each of red, green and blue light. However, the projector 207 may comprise other types of light sources (e.g. color wheels and/or color filters and/or light sources and the like) to produce other colors, for example a cyan light source, a yellow light source, a light source magenta, and the like.

Regardless, the light sources of the projector 207 may have different color coordinates than the colors defined in image data to be projected (e.g. in an sRGB color space of the pixels of the image data 110). Hence, when the projector 207 projects images generated from such image data onto a white surface, the color of the projected images will be in the color space of the projector 207 and not in the color space of the images to be projected.

Furthermore, the color of the surface 217 onto which the projector 207 is projecting may not be white and/or the surface may be multicolored, for example in at least the regions 218. Either way, colors of images as projected by the projector 207 onto the surface 217, as viewed according to the HVS model (e.g. by a human observer and/or a device configured to operate according to the HVS model) at the surface 217, will be different from the colors specified by the sRGB colors (and the like) of the two-dimensional images of the image data.

While the camera 208 may be used to detect the colors of the images projected onto the surface 217, on a pixel-by-pixel basis, the camera 208 generally does not detect color according to the HVS model, but rather according to a camera color space, for example as defined by charge coupled devices (CCDs), lenses and/or filters of the camera 208. Hence, images acquired by the camera 208 may not be relied upon to perform color correction of image data to be projected by the projector 207.

As such, the device 201 is generally configured to determine the per-pixel correction function 109c that may be used to correct the color of images projected by the projector 207 (e.g. red, green and blue), the per-pixel correction function 109c based on: respective images of each of the colors acquired by the camera corrected into the HVS model using a predetermined color-relationship between the camera 208 and the HVS model for the colors of the projector 207, as described in further detail below.

Figure 3:
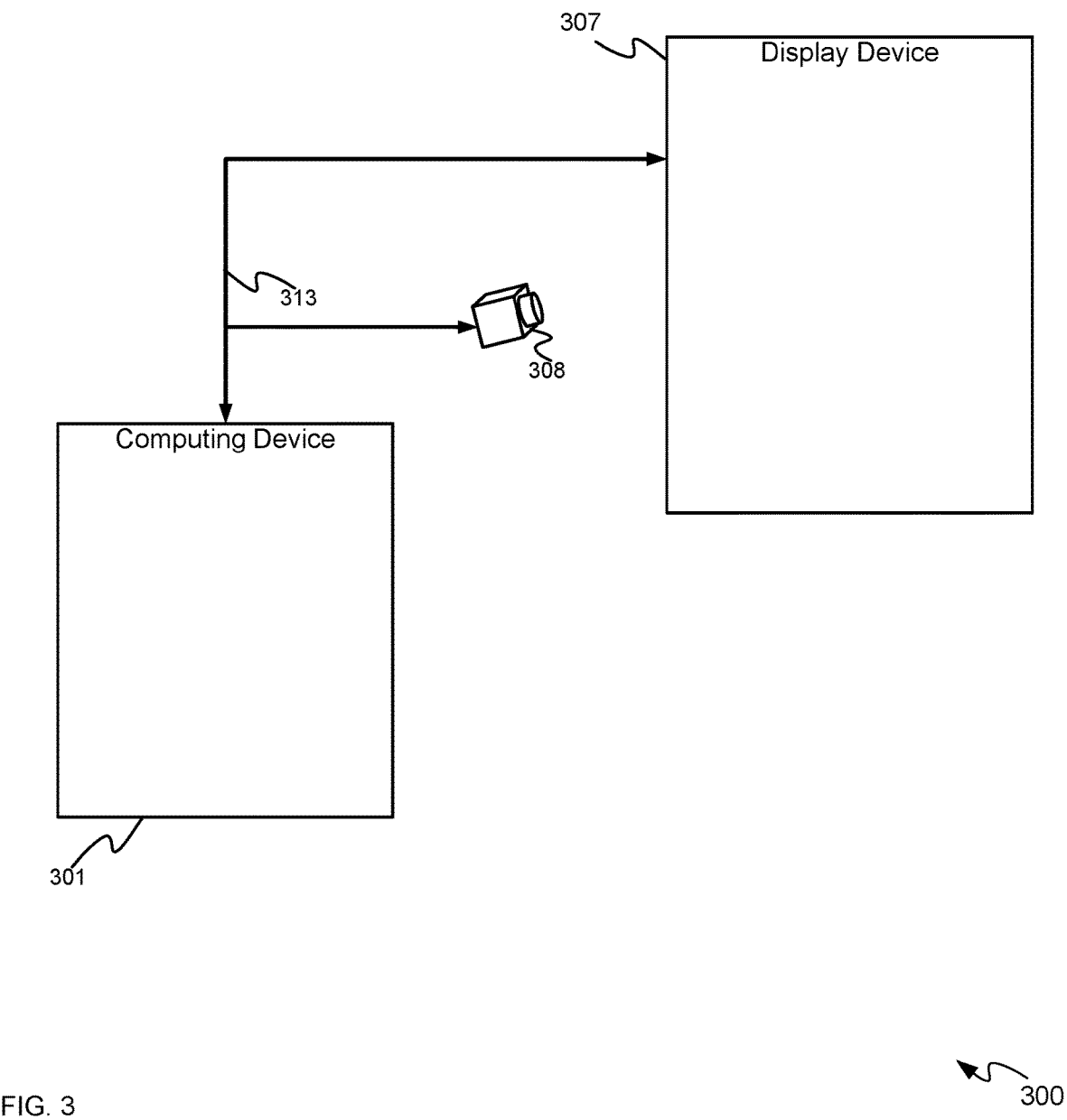
FIG. 3 depicts an alternative system for photometric compensation of images provided by a display device, which can be used in the system of FIG. 1, according to non-limiting examples.

Attention is next directed to FIG. 3 which depicts a system 300 which is similar to the system 300. However, the system 300 comprises a computing device 301 (interchangeably referred to hereafter as the device 301), a display device 307, configured to provide images according to colors of the display device 307, and a camera 308 arranged to detect one or more of the images and the colors provided by the display device 307. As depicted, the device 301 is in communication with the display device 307 and the camera 308 via wired and/or wireless communication links 313. Hence, in contrast to the system 200, the system 300 includes the display device 307 rather than the projector 207, with the camera 308 arranged to detect images and/or colors of the display device 307. The display device 307 may comprise one or more of a flat panel display, a light emitting diode (LED) display, a liquid crystal display (LCD), and the like.

The system 300 suffers from a similar problem as the system 200, in that pixels of the display device 307 (e.g. LEDs of an LED display) may be in a different color space as the sRGB color space of image data used to drive the display device 307, and/or individual or groups of pixels may be at slightly different colors compared to the rest of the display device 307. While the system 300 does not suffer from the problem of projecting onto a non-white surface, the device 301 may generally be configured to determine a per-pixel correction function (e.g. similar to the per-pixel correction function 109c) that may be used to correct the color of images provided by the display device 307, the per-pixel correction function based on: respective images of each of the colors acquired by the camera 308 corrected into an HVS model using a predetermined color-relationship between the camera and the HVS model for the colors of the display device 307, as described in further detail below. For example, the colors provided by the display device 307 may be colors of each of respective arrays of red pixels, green pixels and blue pixels of the display device 307 (e.g. when the display device 307 comprises an LED display, the colors provided by the display device 307 may be colors of each of respective arrays of red LEDs, green LEDs and blue LEDs).

However, in other examples, the projector 207 and/or the display device 307 in either of the systems 200, 300 may be replaced with any type of display device, with either of the cameras 208, 308 arranged to detect the images provided by such a display device. Indeed, such a display device may comprise a projector, an LED display, a flat panel display, and the like. As such, either of the devices 301, 401 may be adapted to determine a per-pixel correction function (e.g. similar to the per-pixel correction function 109c) that may be used to correct the color of images provided by a display device. Indeed, the projector 207 may also be referred to as a display device.

Figure 4:
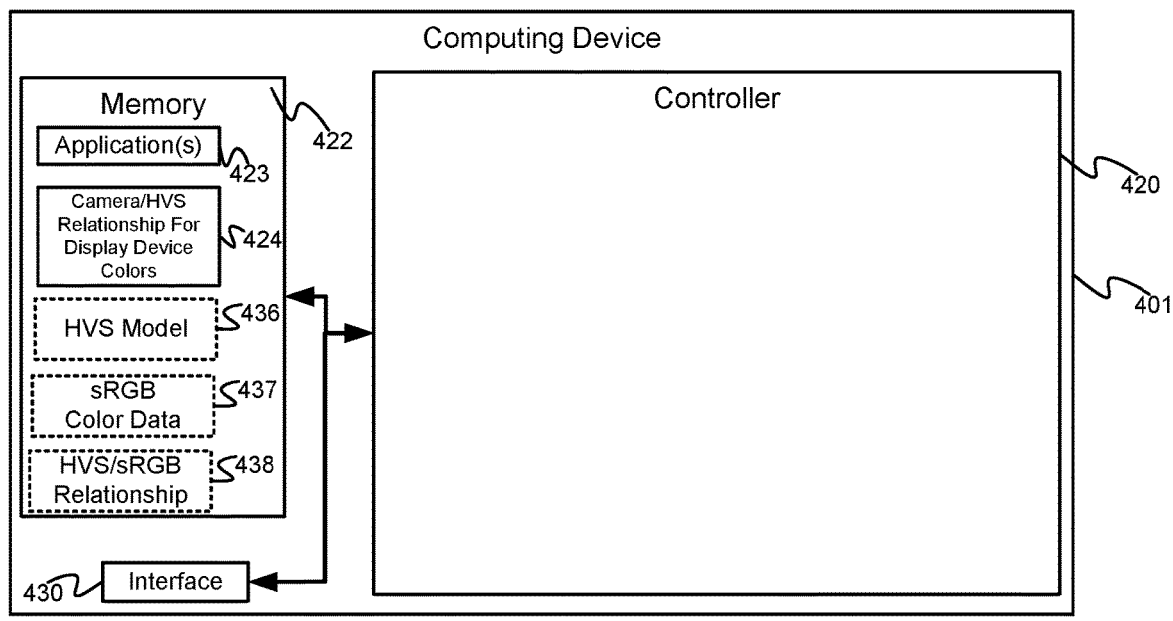
FIG. 4 depicts a block diagram of a computing device for photometric compensation of images, which can be used in the system of FIG. 1, according to non-limiting examples.

Attention is next directed to FIG. 4 which depicts a computing device 401, interchangeably referred to hereafter as the device 401. The device 401 may be embodied as either of the devices 201, 301, or another computing device, for example a computing device used in a factory calibration environment, as described in more detail below.

The device 401, can comprise any suitable computing device, including but not limited to a graphics processing unit (GPU), a graphics processing device, a graphics processing engine, a video processing device, a personal computer (PC), a server, and the like, and generally comprises a controller 420; a memory 422 storing an application 423, and a predetermined color-relationship 424 between a camera and an HVS model for colors of a display device (e.g. between the camera 208 and colors of the projector 207 and/or between the camera 308 and the display device 307, and the like); and a communication interface 430 (interchangeably referred to hereafter as the interface 430).

As depicted, the memory 422 may optionally store other data depending on a use of the device 401. Indeed, when the device 401 is used in a factory calibration environment, the memory 422 may not initially store the predetermined color-relationship 424, but may store an HVS model 436, such as the 1931 CIE (International Commission on Illumination) color space model and the 1931 CIE standard observer color matching functions (e.g. a tristimulus response for red ("R"), green ("G") and blue ("B")). However any suitable type of HVS model and/or color response model is within the scope of the present specification.

Similarly, when the device 401 is used in a factory calibration environment, the memory 422 may further store a sRGB color space definition 437, for example the RGB color coordinates and/or chromaticities for the sRGB color space and/or sRGB spectra for each of for red ("R"), green ("G") and blue ("B").

Alternatively, the memory 422 may not store either of the HVS model 436 or the sRGB color space definition 437 but rather may store an HVS/sRGB relationship 438, for example in a matrix format, and described in more detail below. Indeed, the HVS model 436 and the sRGB color space definition 437, and/or the HVS/sRGB relationship 438 may be used to generate the predetermined color-relationship 424.

Indeed, depending on the use of the device 401, the memory 422 may initially store: the predetermined color-relationship 424; or the HVS model 436 and the sRGB color space definition 437, and/or the HVS/sRGB relationship 438, as described in more detail below.

While not depicted, the memory 422 may further store intrinsic characteristics and/or extrinsic characteristics of a projector 207, for example at the application 423, and/or separate from the application 423. While also not depicted, the memory 422 may further store a model of the surface 217, which may be obtained using laser-scanning techniques, and/or a computer aided drawing (CAD) model of a surface 217 may be available. Such data may be stored at the device 401 when the device 401 is adapted for the functionality of the device 201 and/or when the device 201 is configured to determine the poses of the projector 207; in particular, the intrinsic and/or extrinsic characteristics of the projector 207 and the model of the surface 217 may be used to determine a pose of a projector 207 by the structured light patterns, with the images of structured light patterns, when projected by the projector 207 and detected by a camera 208.

Alternatively, the model of the surface 217 may be determined as the object data 109o using projector-camera mapping techniques.

The controller 420 can comprise a processor and/or a plurality of processors, including but not limited to one or more central processors (CPUs) and/or one or more graphics processing units (GPUs) and/or one or more processing units; either way, the controller 420 comprises a hardware element and/or a hardware processor. Indeed, in some implementations, the controller 420 can comprise an ASIC (application-specific integrated circuit) and/or an FPGA (field-programmable gate array) specifically configured for photometric compensation of images provided by a display device by determining a per-pixel color correction function. Hence, the device 401 may preferably not be a generic computing device, but a device specifically configured to implement specific functionality for photometric compensation of images provided by a display device by determining a per-pixel color correction function. For example, the device 401 and/or the controller 420 can specifically comprise a computer executable engine configured to implement specific functionality configured for photometric compensation of images provided by a display device by determining a per-pixel color correction function.

The memory 422 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the device 401 as described herein are typically maintained, persistently, in the memory 422 and used by the controller 420 which makes appropriate utilization of volatile storage during the execution of such programming instructions. Those skilled in the art recognize that the memory 422 is an example of computer readable media that can store programming instructions executable on the controller 420. Furthermore, the memory 422 is also an example of a memory unit and/or memory module and/or a non-volatile memory.

In particular, the memory 422 stores the application 423 that, when processed by the controller 420, enables the controller 420 and/or computing device 401 to: control a display device to provide colors; control a camera to acquire respective images of each of the colors; determine a per-pixel correction function for modifying image data used by the display device to provide the images, based on: the respective images of each of the colors acquired by the camera corrected into the HVS model 436 using the predetermined color-relationship 424 between the camera and the HVS model 436 for the colors of the display device 603; and control the display device to provide the images using the image data as corrected using the per-pixel correction function. Hence, in these modes, the memory 422 may store the predetermined color-relationship 424, but may not store the HVS model 436, the sRGB color space definition 437 and/or the HVS/sRGB relationship 438.

However, in some modes, for example a calibration mode, the application 423 and/or a calibration application may be used to generate the predetermined color-relationship 424 between the camera and the HVS model 436 for the colors of the display device. For example, in such a calibration mode, the controller 420 and/or computing device 401, when the controller 420 processes the application 423 and/or a calibration application, the controller 420 and/or computing device 401 may be configured to: control the display device to provide colors; control a spectrometer to acquire spectra of the colors; control the camera to acquire images of the colors; and generate the color-relationship 424 between the camera and the HVS model 436 for colors of the display device based on the spectra of the colors, the images of the colors; data used to control the display device to provide the colors; and one or more of the: HVS model 436 and sRGB color space definition 437; and the HVS/sRGB relationship 438. Hence, in these modes, the memory 422 may store the HVS model 436 and the sRGB color space definition 437, and/or the HVS/sRGB relationship 438, but may not initially store the predetermined color-relationship 424 (e.g. until the predetermined color-relationship 424 is generated).

The interface 430 comprises any suitable wired or wireless communication interface configured to communicate with the display device and the camera (e.g. using links 213, 313). The interface 430 may communicate in a wired and/or wireless manner as desired including, but not limited using cables, WiFi communication links, Bluetooth™ communication links, personal area networks, local area networks, and the like.

Figure 5:
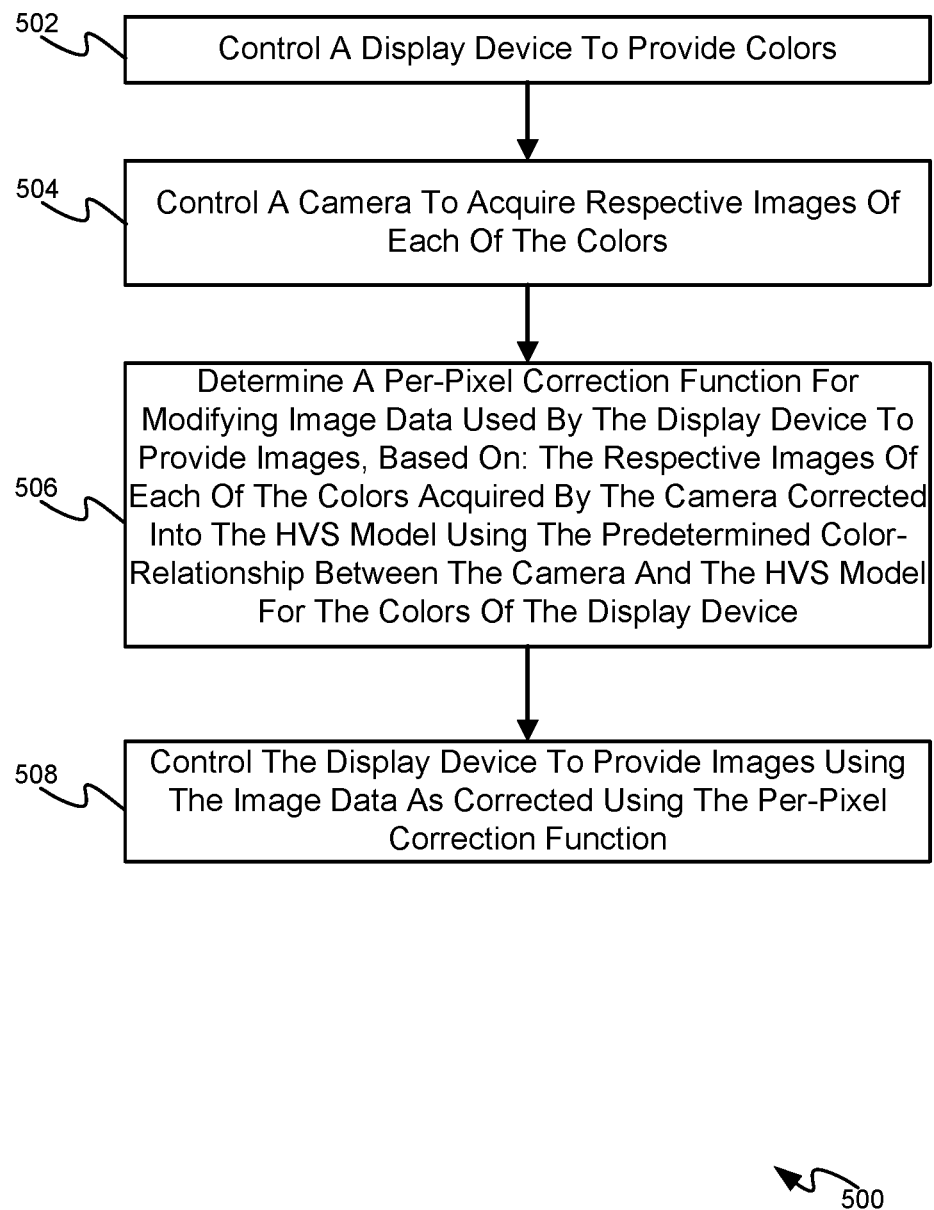
FIG. 5 depicts a method for photometric compensation of images, according to non-limiting examples.

Attention is now directed to FIG. 5 which depicts a flowchart of a method 500 for photometric compensation of images provided by a display device by determining a per-pixel color correction function, according to non-limiting examples. In order to assist in the explanation of the method 500, it will be assumed that the method 500 is performed using the system 200 and/or the system 300, and at least partially by the controller 420 of the device 401, for example when the controller 420 processes application 423. Indeed, the method 500 is one way in which the systems 100, 200, 300 and/or the devices 201, 301, 401 can be configured. Furthermore, the following discussion of the method 500 will lead to a further understanding of the devices 201, 301, 401, and the systems 100, 200, 300 and their various components. However, it is to be understood that the systems 100, 200, 300 and/or the device 301 and/or the method 500 can be varied, and need not work exactly as discussed herein in conjunction with each other, and that such variations are within the scope of present examples.

Regardless, it is to be emphasized, that the method 500 need not be performed in the exact sequence as shown, unless otherwise indicated; and likewise, various blocks may be performed in parallel rather than in sequence; hence the elements of the method 500 are referred to herein as "blocks" rather than "steps". It is also to be understood, however, that the method 500 can be implemented on variations of the systems 100, 200, 300 as well. Furthermore, while device 401 is described as implementing and/or performing at least a portion of the blocks of the method 500, it is appreciated that such blocks of the method 500 occur using the controller 420 processing application 423.

It is furthermore understood that the predetermined color-relationship 424 between a camera and the HVS model 436 for colors of a display device has been determined, for example in a factory calibration environment, as described below with respect to FIG. 6 and FIG. 7.

At a block 502, the controller 420 controls a display device to provide colors, for example red, green and blue colors and/or any primary colors of the display device and/or colors of any light sources of the display device. Hence, such primary colors may be defined by the light sources of the projector 207 and/or the pixels of the display device 307, LEDs of an LED display and/or any primary colors of the display device used to provide images. Hereafter, while the method 500 will be described with respect to using red, green and blue colors and/or three primary colors, persons of skill in the art understand that the method 500 may be implemented with any set of three (or more) primary colors used by a display device to provide images including, but not limited to, cyan, magenta, and yellow (e.g. in a CMY (Cyan Magenta Yellow) and/or a combination of red, green and blue and cyan, magenta, and yellow.

When the display device comprises the projector 207, at the block 502, the projector 207 may be controlled to provide the colors by projecting colors for each of three RGB light sources onto the surface 217. Prior to projecting the colors in a determination of the per-pixel correction function, the projector 207 may be set to a target white point. Furthermore, in these examples, the controller 420 may be further configured to: control the projector 207 to project the colors in association with using structured light patterns to determine a geometry-relationship between the projector 207 and camera 208. For example, structured light patterns (e.g. in black and white) may be projected onto the surface 217 prior to projecting the colors at the block 502 and/or the structured light patterns projected onto the surface 217 may comprise sequentially projected red, green and blue images of rows and/or columns, and/or grid patterns, for each of the RGB light sources of the projector 207.

Regardless, the camera 208 may detect images of the structured light patterns projected onto the surface 217 and the controller 420 may compare the structured light patterns with the images detected by the camera 208 to determine a geometry-relationship between the projector 207 and camera 208, to map pixels of the projector 207 to pixels of the camera 208. The structured light patterns may also be to determine one or more of the pose data 109p and the object data 109o. Furthermore, the geometry-relationship and/or the mapping of the pixels between the projector 207 and camera 208 generally enables the controller 420 to determine pixels of images detected by the camera 208 that correspond to regions of the target images used to control the projector 207 to project images onto the surface 217.

At a block 504, the controller 420 controls a camera to acquire respective images of each of the colors provided by the display device. For example, when the display device comprises the projector 207 and the colors are projected by the projector 207 onto the surface 217 at the block 502, and at the block 504 the camera 208 acquires the respective images of each of the colors as projected onto the surface 217. When the structured light patterns projected by the projector 207 onto the surface 217 include the colors, the respective images of each of the colors acquired by the camera 208 comprises images of the structured light patterns as projected onto the surface 217.

At a block 506, the controller 420 determines a per-pixel correction function for modifying image data used by the display device to provide the images, based on: the respective images of each of the colors acquired by the camera corrected into the HVS model 436 using the predetermined color-relationship 424 between the camera and the HVS model 436 for the colors of the display device 603. As described above, the HVS model 436 may comprise the 1931 CIE color space model, however any HVS model is within the scope of the present specification. Furthermore, in some examples, the per-pixel correction function includes an ambient light correction factor, as described in more detail below.

Indeed, the per-pixel correction function may be different for each pixel of the display device. Hence, for example, when the display device comprises the projector 207, pixels of images projected onto the regions 218 of the surface 217 may be specifically corrected for the colors of the regions 218 and colors of the surface 217 outside the regions 218.

When the display device comprises the display device 307 and/or an LED display, the display device 307 and/or the LED display is controlled to provide the colors (e.g. of each of the pixels and/or LEDs) at the block 502, and the camera 308 acquires images of the colors at the block 504. Similarly, the display device 307 may be controlled to provide structured light patterns, and the camera 308 may acquire images of the structured light patterns as provided at the display device 307, which may be used to determine a geometry-relationship between the display device 307 and the camera 308.

At a block 508, the controller 420 controls the display device to provide images using the image data as corrected using the per-pixel correction function. For example image data in the sRGB color space are corrected on a per-pixel basis using the per-pixel correction function such that when a human observer views the images provided by the display device, as corrected, the human observer views the provided images according to the sRGB color space.

In examples where the display device comprises the projector 207, and the projector 207 comprises a 1-chip DMD projector, the controller 420 may be further configured to apply a look-up table (LUT) to linearize images for projection when controlling the projector 207 to project the images using the image data as corrected using the per-pixel correction function; for example as 1-chip DMD projectors may project non-linearly, a predetermined LUT may be used to adjust the image data to account for the non-linear projection of the projector 207, a process known as linearization. However, any process for linearizing images for projection is within the scope of the present specification including, but not limited to, any suitable mathematical function. Furthermore, when the projector 207 is not a 1-chip DMD projector, the linearization may not occur.

The method 500 is next described with respect to FIG. 6 to FIG. 10. In particular, generation of the predetermined color-relationship 424 will be described with respect to FIG. 6 and FIG. 7, and which may occur in factory calibration setting, and the method 500 will be described with respect to FIG. 8, FIG. 9 and FIG. 10, and which may occur at an installation (for example where a projection mapping show is to occur). The method 500 will be described with respect to the device 201, the projector 207 and the camera 208 such that the predetermined color-relationship 424, as generated, is between the camera 208 and the HVS model 436 for the colors of the projector 207603.

Figure 6:
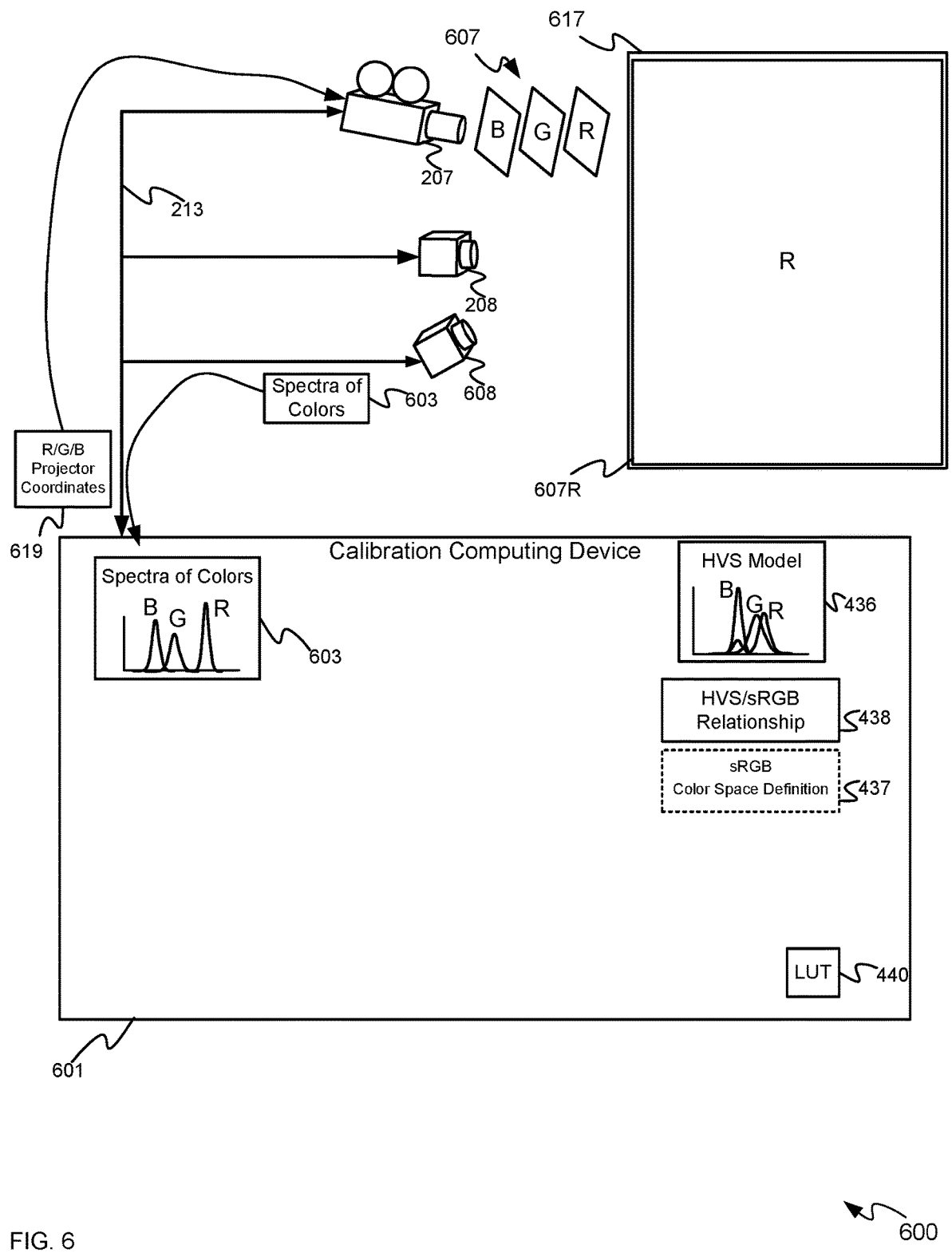
FIG. 6 depicts a determination of spectra of colors of the projector of the system of FIG. 2, in a factory calibration environment, according to non-limiting examples.
Figure 7:
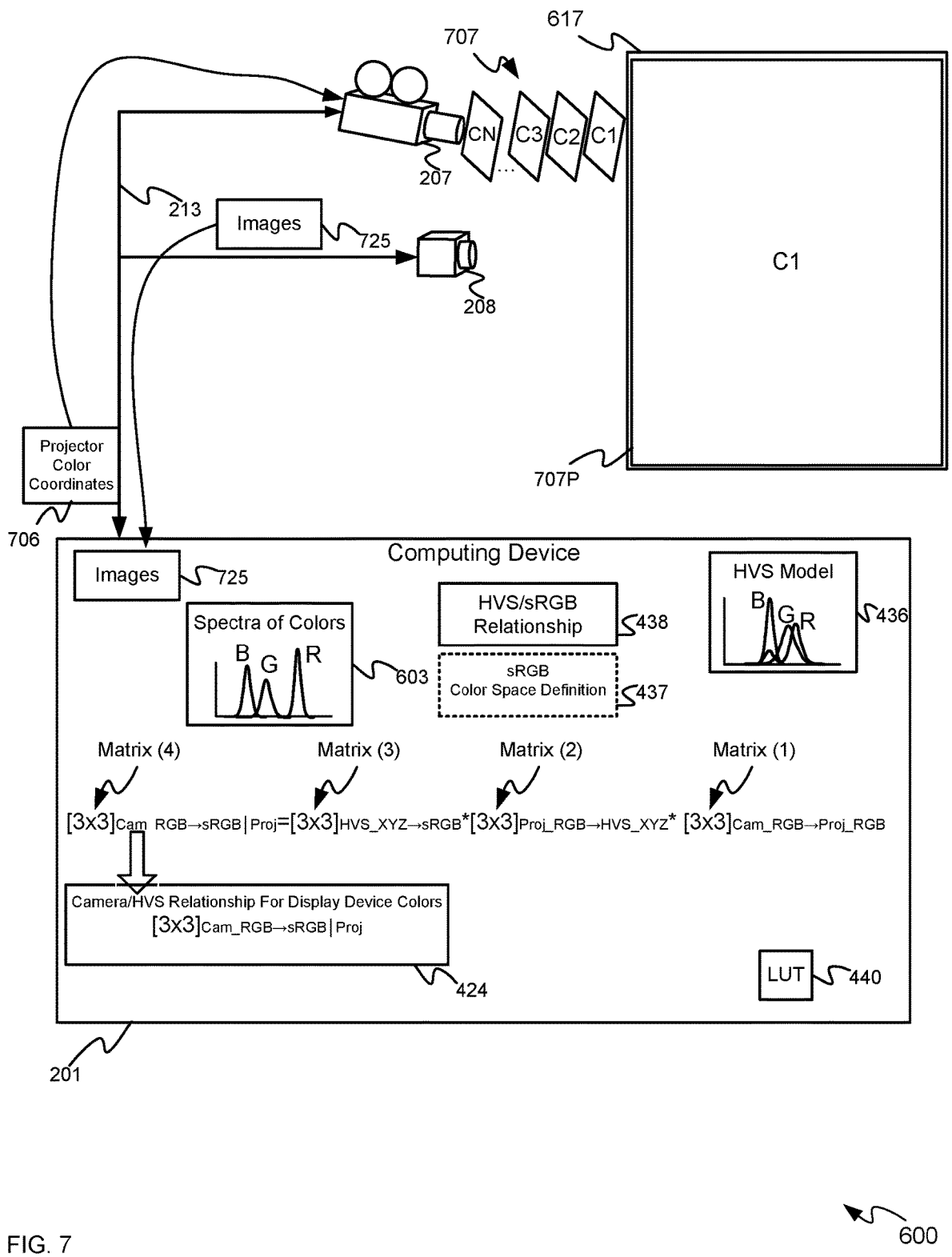
FIG. 7 depicts a determination of a camera-display color relationship between the camera and a Human-Visual System model for the colors of the projector of the system of FIG. 2, in the factory calibration environment, according to non-limiting examples.

Attention is next directed to FIG. 6 and FIG. 7 each of which depict a system 600, similar to the system 200, with like components having like numbers, however with a calibration computing device 601 in communication with the projector 207 and the camera 208. Hence, the system 600 may comprise a factory calibration environment. The calibration computing device 601 is similar to the device 401 however with the HVS model 436 (as depicted, the 1931 CIE tristimulus response curves) and the sRGB color space definition 437, and/or the HVS/sRGB relationship 438 stored thereon. Hence, the calibration computing device 601 may comprise the device 401 operated in a calibration mode in a factory calibration environment.

The system 600 further includes a spectrometer 608 in communication with the calibration computing device 601, the spectrometer 608 configured to detect intensity of light as a function of wavelength and/or frequency; for example the spectrometer 608 is in communication with the calibration computing device 601 and is positioned to acquire spectra of images projected by the projector 207 onto a white surface 617.

In particular, FIG. 6 depicts the projector 207 being controlled (e.g. via a R/G/B projector coordinates 619, for example sRGB coordinates) transmitted to the projector 207 by the calibration computing device 601) to sequentially project RGB colors 607 of the projector 207 onto the white surface 617, for example in a factory setting and/or in a provisioning and/or calibration process to determine spectra 603 of colors of the projector 207, for example using the spectrometer 608. While only a projected image 607R of red is depicted as projected onto the white surface 617, a person of skill in the art understands that each of the RGB colors 607 are sequentially projected onto the white surface 617.

As depicted, the calibration computing device 601 further stores a predetermined LUT 440 (and/or a mathematical function) which may be provided with the projector 207, the LUT 440 (and/or a mathematical function) comprising data to linearize image data used to control the projector 207 (e.g. when the projector 207 comprises a 1-chip DMD projector); while not depicted, the LUT 440 may be predetermined in a separate LUT determination process as known to persons of skill in the art.

In particular, as depicted in FIG. 6, the spectrometer 608 is arranged to detect spectra 603 of the RGB colors 607 projected onto the white surface 617, for example, one spectrum for each of the RGB colors 607. Furthermore, the spectrometer 608 provides the spectra 603 to the calibration computing device 601. Hence, as depicted at the calibration computing device 601 in FIG. 6, the spectra 603 comprise three spectra, one for each of red ("R"), green ("G") and blue ("B") light of the respective light sources of the projector 207.

Once the spectra 603 are determined, and as depicted in FIG. 7, the calibration computing device 601 may use target projector color coordinates 706 (e.g. sRGB coordinates) to control the projector 207 to project full field colors 707 (e.g. the projector 207 projects one color at a time, for example using all projector pixels) that include many projector colors, labelled "C1", "C2", "C3" . . . "CN" and which may include at least nine different colors (e.g. N=9 and the at least nine different colors may include full red, full green, full blue, full cyan, full magenta, full yellow, full white, and at least two other colors) to determine the predetermined color-relationship 424, which may be a 3×3 matrix (and hence initially has nine known values). However, more than nine different colors may be used to over-constrain the determination of the predetermined color-relationship 424. In general, the target projector color coordinates 706 correspond to coordinates used by the projector to project each of the at least nine colors. Furthermore, while full field color projections is described, in other implementations, the projected colors 707 may include multicolored images with regions of colors of a suitable size.

While only a projected image 707P of the color "C1" is depicted as projected onto the white surface 617, a person of skill in the art understands that each of the at least nine colors 707 are sequentially projected onto the white surface 617.

The camera 208 is also arranged to detect images 725 of the projected images 707P and provide the images 725 to the calibration computing device 601.

The colors of the images 725 will further differ from the sRGB color coordinates specified in the target projector color coordinates 706 and also differ from how the colors of the images 725 are detected using the HVS model 436 (e.g. as a human would perceive colors of the images 725) as the images 725 of the projected images 707P are detected according to the color space of the camera 208.

Hence, the calibration computing device 601 generally determines a function and/or relationship for converting RGB camera colors to sRGB color space for the particular RGB color space of the projector 207. For example, the calibration computing device 601 may be configured to:

Set the camera 208 to a linear gamma and any suitable exposure and/or aperture and/or gain settings.

Set the projector 207 to a target white point on the white surface 617 (e.g. the projector 207 is scaled such that when all of the red, green and blue light sources are turned on, their combination, as projected, is white at target x,y coordinates in the CIE 1931 xy (e.g. HVS model 436) color space and/or white at target x,y coordinates any HVS model being used)

Use the target projector color coordinates 706 to control the projector 207 to project the colors 707. When the projector 207 comprises a 1-chip DMD projector, the LUT 440 (and/or a mathematical function) may be applied to the target projector color coordinates 706 prior to projection to linearize (e.g. apply a reverse gamma function) the target projector color coordinates 706 to account for non-linearity of the projector 207.

Control the camera 208 to capture the images 725 of the projected images 707P at the white surface 617.

From the images 725, determine the average camera color for each of the colors 707 projected by the projector 207.

Determine a best fit 3×3 matrix to convert RGB projector colors to RGB camera colors; and invert the best fit 3×3 matrix to determine a 3×3 matrix for RGB camera color to RGB projector color.

For example, the 3×3 matrix for RGB camera color to RGB projector color may be expressed as:

$$[3\times 3]_{Cam\_RGB \rightarrow Proj\_RGB} \cdots \quad \text{Matrix (1)}$$

Furthermore, from the spectra 603, the white point setting of the projector 207, and the HVS model 436, a 3×3 matrix may be determined to convert RGB projector colors to a human visual system (HVS) XYZ value (e.g. a color in XYZ 1931 color space coordinates, which may be may be expressed as:

$$[3\times 3]_{Proj\_RGB \rightarrow HVS\_XYZ} \cdots \quad \text{Matrix (2)}$$

Furthermore, the HVS/sRGB relationship 438 may comprise a 3×3 matrix used to convert the HVS XYZ values to the sRGB color space; alternatively, such a 3×3 matrix may be determined from the HVS model 436 and the sRGB color space definition 437 (e.g. used to define the coordinates of the target projector color coordinates 706). Regardless of whether such a 3×3 matrix is predetermined in the the HVS/sRGB relationship 438, or determined from the HVS model 436 and the sRGB color space definition 437, the 3×3 matrix may be expressed as:

$$[3\times 3]_{HVS\_XYZ \rightarrow sRGB} \cdots \quad \text{Matrix (3)}$$

From the Matrix (1), the Matrix (2), and the Matrix (3), a 3×3 matrix may be determined to convert RGB camera colors to sRGB color space for the particular RGB color space of the projector 207, which may be expressed as:

$$[3\times 3]_{Cam\_RGB \rightarrow sRGB|Proj} \cdots \quad \text{Matrix (4)}$$

The Matrix (4) may be determined by multiplying together each of the Matrix (1), the Matrix (2) and the Matrix (3) as follows:

$$[3\times 3]_{Cam\_RGB \rightarrow sRGB|Proj} = [3\times 3]_{HVS\_XYZ \rightarrow sRGB} * [3\times 3]_{Proj\_RGB \rightarrow HVS\_XYZ} * [3\times 3]_{Cam\_RGB \rightarrow Proj\_RGB} \cdots \quad \text{Equation (1)}$$

The determination of the Matrix (4) is also depicted in FIG. 7.

Hence, the Matrix (4) comprises the predetermined color-relationship 424 between the camera 208 and the HVS model 436 for the colors of the projector 207 and in FIG. 7 the Matrix (4) is further stored as the predetermined color-relationship 424. Put another way, the predetermined color-relationship 424 represents a matrix that converts how the camera 208 "sees" the colors of the projector 207 to how a human "sees" (e.g. as defined by the HVS model 436) the colors of the projector 207, and is hence specific to the color spaces of the projector 207, the camera 208 and the HVS model 436.

A person of skill in the art understands that while the calibration computing device 601 is described as determining the predetermined color-relationship 424, any computing device similar to the calibration computing device 601 may determine the predetermined color-relationship 424, for example in a factory setting, and the predetermined color-relationship 424 may be stored at the device 201 prior to shipping. Alternatively, the projector 207 and the camera 208 may be shipped (e.g. to a location where the system 200 is located) with a memory that stores the predetermined color-relationship 424, and the LUT 440 (and/or a mathematical function) for storage at the device 201 in the system 200.

Figure 8:
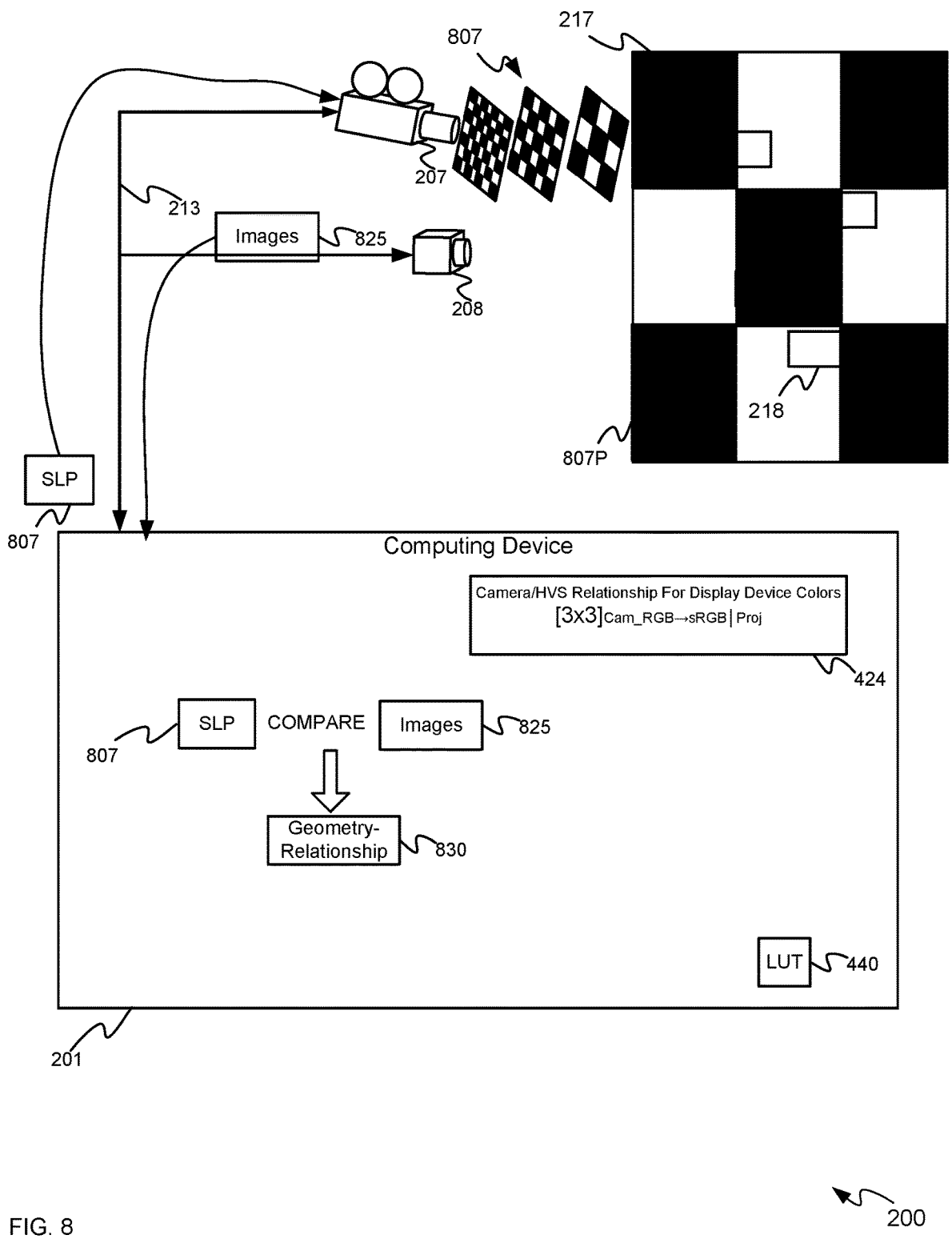
FIG. 8 depicts a determination of a geometry-relationship between the camera and the projector of the system of FIG. 2, in an installation, according to non-limiting examples.
Figure 9:
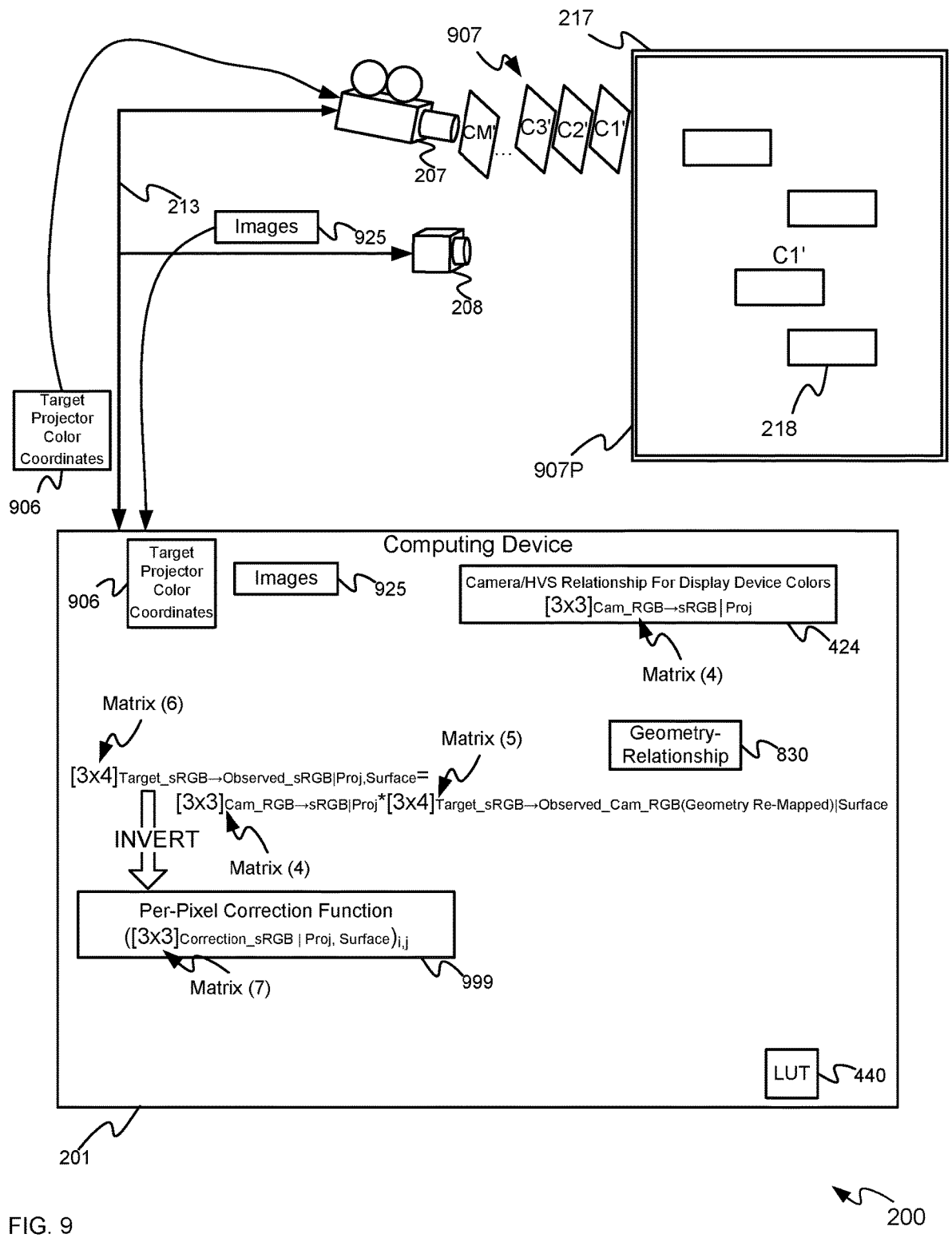
FIG. 9 depicts a determination of a per-pixel correction function to correct target image pixels such that resulting projected images are in the same color space of the target image pixels as viewed according to the Human-Visual System model, in the installation, according to non-limiting examples.

Attention is next directed to FIG. 8 and FIG. 9 which depicts a specific implementation of the method 500 in the system 200, and a determination of the per-pixel correction function of the block 508. Hence, the system 200 may comprise an installation (for example where a projection mapping show is to occur).

Hence, each of FIG. 8 and FIG. 9 again depict the system 200, however the device 201 has been configured with: the predetermined color-relationship 424 between the camera 208 and the HVS model 436 for the colors of the projector 207, for example as stored in a memory accessible to a controller of the device 201 (e.g. respectively, the memory 422 and the controller 420). The device 201 has been further configured with the LUT 440 (and/or a mathematical function). However, the device 201 may not store the spectra 603, HVS model 436, the sRGB color space definition 437 and/or the HVS/sRGB relationship 438. Indeed, a person of skill in the art understands that the spectra 603, HVS model 436 and the sRGB color space definition 437, and/or the HVS/sRGB relationship 438, were used to determine the predetermined color-relationship 424 and need not be used in the implementation of the method 500.

Hence, in FIG. 8 and FIG. 9, the device 201 is understood to be implementing the method 500 and/or the application 423.

With reference to FIG. 8, in some examples, the projector 207 is controlled to project a plurality of structured light patterns 807 (e.g. via the device 201 transmitting a command and/or the structured light patterns 807 to the projector 207) onto the surface 217. As depicted, the structured light patterns 807 are each grid patterns of increasing resolution projected sequentially. Alternatively, the structured light patterns 807 may comprise sequences of rows and columns of progressively smaller (or higher) resolution. Alternatively, the structured light patterns 807 may comprise the projector 207 sequentially projecting one pixel at a time, for example in a raster pattern. While only one projected structured light pattern 807P (e.g. of the smallest resolution grid) is depicted as projected onto the surface 217, a person of skill in the art understands that each of structured light patterns 807 are sequentially projected onto the white surface 617.

Furthermore, the camera 208 acquires images 825 of each of the projected structured light patterns 807P as projected onto the surface 217, and provides the images 825 to the device 201. The device 201 compares the images 825 and the structured light patterns 807 to determine a geometry-relationship 830 between the projector 207 and the camera 208 which may include a mapping of projector pixels to camera pixels. The pose data 109p of the projector 207 may be determined from geometry-relationship 830 (as may the object data 1090). As will be further explained below, the mapping of projector pixels to camera pixels as represented by the geometry-relationship 830 further enables the device 201 to determine a mapping of camera pixels to pixels of target images, used to control the projector 207 to project.

For example, with attention next directed to FIG. 9, the device 201 uses target projector color coordinates 906 (defined with respect to sRGB color coordinates) to control the projector 207 (e.g. at the block 502 of the method 500) to project respective full field images 907 of many projector colors, labelled "C1'", "C2'", "C3'" . . . "CM'" and the images 907 may include at least nine different colors (e.g. M=9 and the at least nine different colors may include full red, full green, full blue, full cyan, full magenta, full yellow, full white, and at least two other colors; however the number or colors projected may include tens or even hundreds of full field colors. Indeed, many colors that may be projected by the projector 207 may be included in the target projector color coordinates 906 and the images 907. For example, a projected image 907P of the images 907 is depicted as being projected onto the surface 217. Furthermore, while full field color projections is described, in other implementations, the projected images 907 may include multicolored images with regions of colors of a suitable size.

While only a projected image 907P of the color "C1'" is depicted as projected onto the surface 217, a person of skill in the art understands that each of the images 907 are sequentially projected onto the surface 217.

The camera 208 is also arranged to detect images 925 of the projected images 907P (e.g. of each of the "M" colors) and provide the images 925 to the device 201. Furthermore, while only one image 907 and one projected image 907P are depicted, a person of skill in the art understands that a plurality of images 907 may be projected in a sequence (e.g. with the colorss being varied between images 907), such that a plurality of images 925 (e.g. of the projected images 907P) are acquired by the camera 208.

As depicted in FIG. 9, the device 201 controls the camera 208 (e.g. at the block 504 of the method 500) to acquire images 925 of the projected images 907P that includes the projected colors. As depicted, the projected images 907P include regions that are projected onto the regions 218. Hence, the colors of pixels in the images 925 in the camera color space will differ from the sRGB colors of pixels of the target projector color coordinates 906 as the respective color spaces of the projector 207 and the camera 208 both differ from the sRGB color space; furthermore, as the surface 217 includes at least some non-white regions 218 and/or as the surface 217 may be multicolored (i.e. not white), the colors of pixels of the images 925 will further differ from the colors of pixels of the target projector color coordinates 906 due to the colors of the surface 217.

Hence, a color of each pixel from each of the images 925 of the projected images 907P may be compared with the color of each corresponding pixel of the target projector color coordinates 906 to determine (e.g. at the block 506 of the method 500) a correction function for each pixel using the predetermined color-relationship 424 to further determine a per-pixel color correction function that takes into account the colors of the surface 217. Such a per-pixel correction function may be used to modify image data, for example target image data in the sRGB color space, used by the projector 207 to project images onto the surface 217 that, when viewed according to the HVS model 436 (e.g. by a human observer), will be in the sRGB color space of the target image data.

The determination of the per-pixel correction function is generally based on: the respective images 925 of each of the colors corrected into the HVS model 436 using the predetermined color-relationship 424 between the camera 208 and the HVS model 436 for the colors of the projector 207.

For example, for every projector pixel, as represented in the images 925, the device 201 may determine a 3×4 matrix to represent an sRGB color modification caused by the surface 217, for the projector light sources (e.g. which may alternatively be referred to as in-field surface color correction calibration); such a 3×4 matrix takes into account the color changes of projected images due to ambient light. For example, an additional column is added to a 3×3 matrix that represents the ambient light correction to produce a 3×4 matrix (e.g. a column of 1s). While a particular matrix structure is described herein, however, any suitable matrix structure is within the scope of the present specification.

For example, device 201 may first determine a 3×4 matrix that represents the color modification of the projected images 907P caused by the surface 217 as follows:

- Set the projector 207 to a target white point, for example the same target white point used to determine the predetermined color-relationship 424 between the camera 208 and and the HVS model 436 for the colors of the projector 207.
- Control the projector 207 to project the structured light patterns 807 on the surface 217.
- Determine the camera-to-projector geometry-relationship 830 and/or camera-pixel-to-projector-pixel mapping using images 825 of the projected structured light patterns 807P.
- Control the projector 207 to project the images 907 (e.g. in projector RGB color space), based on the target projector color coordinates 906 (e.g. in sRGB color space), and control the camera 208 to acquire the images 925 of the projected images 907P. When the projector 207 comprises a 1-chip DMD projector, the LUT 440 (and/or a mathematical function) may be applied to the target projector color coordinates 906 prior to projection to compensate the target projector color coordinates 906 to account for non-linearity of the projector 207.
- Map the pixels of the camera images 925 to the projector pixels and/or the target projector color coordinates 906 using the camera-to-projector geometry-relationship 830.
- For every projector pixel, find a best fit 3×4 matrix to represent a color modification caused by the surface 217, for example by comparing color sRGB coordinates of pixels of the target projector color coordinates 906 with the corresponding pixels of the images 925 acquired by the camera 208; an extra column of the 3×4 matrix adds R,G,B constant terms to account for ambient light.

Such a 3×4 matrix for each projector pixel may be expressed as:

$$[3\times4]_{Target\_sRGB \rightarrow Observed\_Cam\_RGB(Geometry\ Re\text{-}Mapped)|Surface}\ldots \quad \text{Matrix (5)}.$$

As also depicted in FIG. 9, each Matrix (5) may be multiplied by the Matrix (4) of the predetermined color-relationship 424 between the camera 208 and the HVS model 436 for the colors of the projector 207 when projecting onto a white surface, to determine a 3×4 matrix for each projector pixel that represents the sRGB color modification caused by the surface 217 for each projector pixel, which may be expressed as follows:

$$[3\times4]_{Target\_sRGB \rightarrow Observed\_sRGB|Proj,Surface}\ldots \quad \text{Matrix (6)}$$

The Matrix (6), for each projector pixel, may be determined from:

$$[3\times4]_{Target\_sRGB \rightarrow Observed\_sRGB|Proj,Surface} = [3\times3]_{Cam\_RGB \rightarrow sRGB|Proj} * [3\times4]_{Target\_sRGB \rightarrow Observed\_Cam\_RGB(Geometry\ Re\text{-}Mapped)|Surface}\ldots \quad \text{Equation (2)}.$$

In general, the Matrix (6) represents a function used to convert sRGB color coordinates of a pixel in the target 906 to sRGB color coordinates of a corresponding pixel in the images 925, taking into account color changes that occur due to: the color space of the projector 207 and the color(s) of the surface 217.

The Matrix (6) for each projector pixel may then be inverted (e.g. using, for example any suitable matrix inverse approximation, including, but not limited to the Matlab™ pseudo-inverse function) to determine the per-pixel correction function, which may be expressed as:

$$[3\times4]_{Correction\_sRGB|Proj,Surface}\ldots \quad \text{Matrix (7)}$$

Hence, the Matrix (7) comprises a component of the per-pixel correction function of the block 506 of the method 500 and FIG. 8 further depicts determination of Matrix (6) and the Matrix (7), as well as storage of the Matrix (7) as the (i,j) component of a per-pixel correction function 999, for example for a pixel corresponding to the "$i^{th}$" row and "$j^{th}$" column of the projector pixels.

It is understood that the per-pixel correction function 999 comprises a Matrix (7) for each projector pixel. The per-pixel correction function 999 may be provided as the per-pixel correction function 109c, to the rendering device 101 and/or the device 108 and/or the content player 103, and the like and used to color correct the image data 110 on a pixel by pixel basis.

Figure 10:
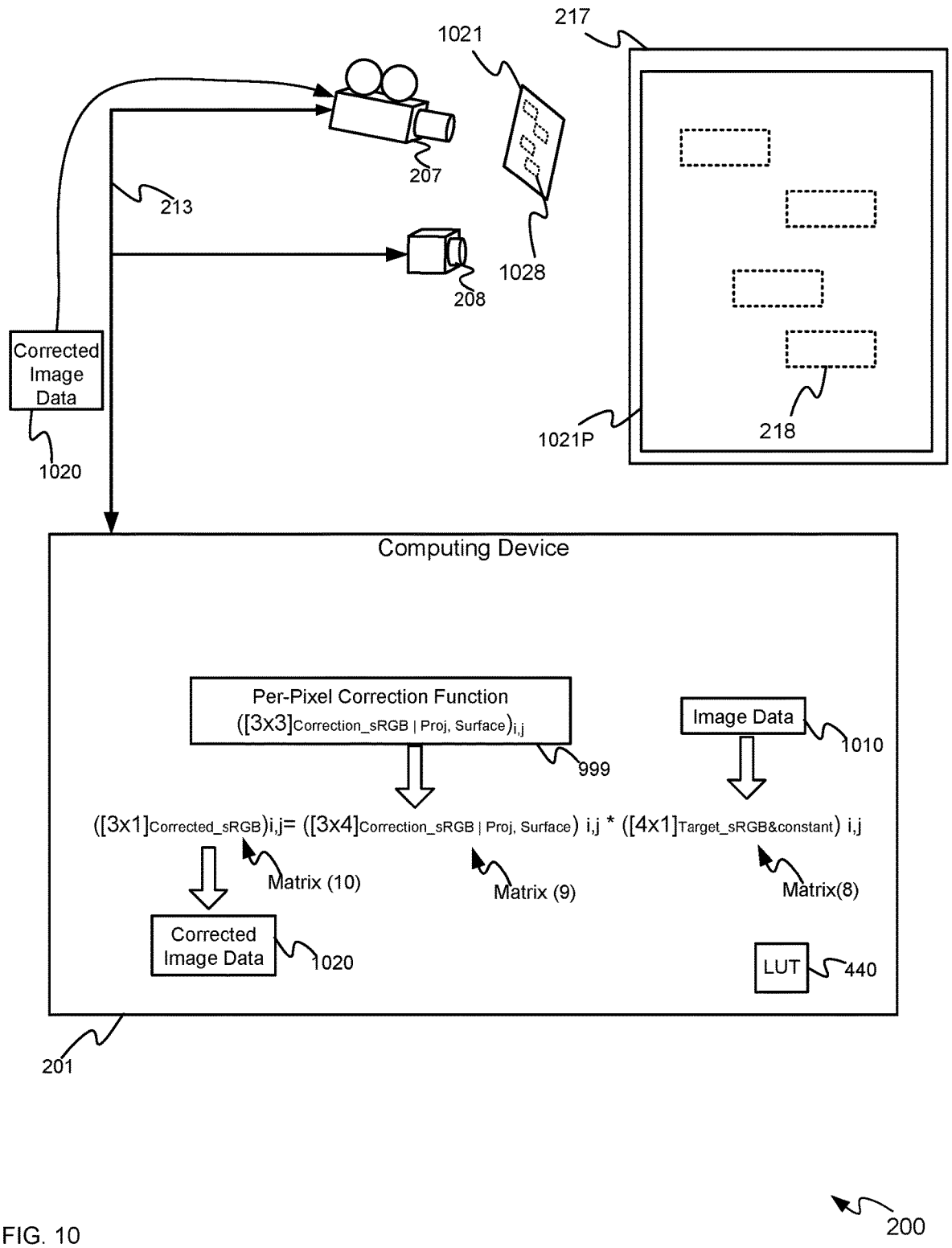
FIG. 10 depicts controlling the projector of the system of FIG. 2 to project using target image pixels, corrected using the per-pixel correction function, in the installation, according to non-limiting examples.

To illustrate such a correction, attention is next directed to FIG. 10 which depicts the system 200 with the per-pixel correction function 999 stored at the device 201. It is hence understood that in FIG. 10, the per-pixel correction function 999 has been determined and that the device 201 is to project images based on image data 1010, which may be similar to the image data 110. In particular, color coordinates of pixels in the image data 1010 may be in the sRGB color space, and the projector 207 is to be controlled to project images (e.g. at the block 508 of the method 500) onto the surface 217 based on the image data 1010 which, when viewed according to the HVS model 436 (e.g. a human observer) at the surface 217 are also in the sRGB color space.

Hence, the per-pixel correction function 999 is used to correct the image data 1010, on a pixel-by-pixel basis to produce corrected image data 1020 (which may be further adjusted using the LUT 440 to adjust color coordinates of the corrected image data 1020 for non-linearity of the projector 207), and which also takes into account ambient light.

The corrected image data 1020 is used to control the projector 207 to project images 1021 onto the surface 217 as projected images 1021P. Hence, each pixel of the images 1021 may be color corrected (and take ambient light into account) using the per-pixel correction function 999 such that the projected images 1021P at the surface 217 appear to be in the sRGB color space when viewed according to the HVS model 436 (e.g. a human observer).

For example, as depicted, the images 1021 as projected include regions 1028 of pixels that are color corrected to account for color changes of the projected images 1021P that occur due to the color of the regions 218, though each pixel of the images 1021 may be color corrected to account for a color of a corresponding region of the surface 217. To illustrate the color correction of the projected images 1021P for the regions 218, the regions 218 are depicted at the surface 217 using dashed lines to indicate that the color differences due to regions 218 may no longer be visible to a human observer.

An example of color correction of the i,j$^{th}$ pixel of an image of the image data 1010 is also depicted in FIG. 10. For example, the color coordinates of the i,j$^{th}$ pixel of an image of the image data 1010 is expressed as:

$$([4\times1]_{Target\_sRGB\&constant})^{i,j} \ldots \qquad \text{Matrix(8)}$$

It is understood that Matrix (8) comprise 3 sRGB color coordinates (e.g. in a column, with row of the column comprising a respective coordinate for each of red, green and blue light), with an ambient constant added thereto (e.g. "1" added as a fourth row in the column.

Matrix(8) is multiplied by the corresponding per-pixel correction function matrix that corresponds to the i,j$^{th}$ pixel, which may be expressed as:

$$([3\times4]_{Correction\_sRGB|Proj,Surface})^{i,j} \ldots \qquad \text{Matrix(9)}$$

The corrected color coordinates of the i,j$^{th}$ pixel of the corrected image data 1020 may be expressed as:

$$([3\times1]_{Corrected\_sRGB})^{i,j} \ldots \qquad \text{Matrix(10)}$$

The Matrix (10), for each i,j$^{th}$ pixel of the corrected image data 1020 may be determined from:

$$([3\times1]_{Corrected\_sRGB})^{i,j} = ([3\times4]_{Correction\_sRGB|Proj,Surface})^{i,j} * ([4\times1]_{Target\_sRGB\&constant})^{i,j} \ldots \qquad \text{Equation (3).}$$

It is further understood that each pixel of each image in the image data 1010 is corrected in a similar manner such that the projected images 1021P are in the sRGB color space when viewed according to the HVS model 436 (e.g. a human observer).

While the method 500 has been described with respect to the system 200, the method 500 may be applied to the system 300 and/or any similar system with a display device and a camera. For example, with respect to the system 300, spectra of the pixels of the display device 307 (e.g. LEDs of an LED display) may be determined using a spectrometer in a factory setting, and the like, and a color relationship 424 between the camera and an HVS model for the colors of the display (similar to the predetermined color relationship 424) may be similarly determined between the camera 308 and the display device 307. The camera-display device color relationship between the camera 308 and the display device 307 may be used in the system 300 to determine a per-pixel correction function. For example the device 301 may map pixels of the camera 308 to pixels of the display device 307 (e.g. the display device 307 is controlled to provide structured light patterns which the camera 308 captures in respective images). The device 301 may then control the display device 307 to provide images similar to the images 907, and a per-pixel correction function may be determined. However, in some examples the correction function need not be a per-pixel correction function as, for example flat panel display devices, and the like do not project onto multicolored surfaces. Such a monolithic (e.g. not per-pixel) correction function may be used with non-projection display devices that have suitable color uniformity.

However, in other examples the correction function for some non-projection display devices that have poor color uniformity may comprise a per-pixel correction function. For example, LED displays may have a similar problem to projectors regarding color in that such LED displays may not have color uniformity: in particular, the LEDs often have color variations related to the semiconductor process "bins" from which the LEDs are selected. Such color non-uniformities may be corrected using a per-pixel correction function. Indeed, other types of some non-projection display devices may also suffer from similar color non-uniformities and hence the method 500 may be used to correct for such color non-uniformities using a per-pixel correction function.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A device comprising:
 a controller in communication with:
  a projector configured to project colors and project images according to the colors of the projector; and
  a camera arranged to detect one or more of the images and the colors projected by the projector, the camera and the projector having a common field of view; and
  a memory storing: a predetermined color-relationship between the camera and a human visual system (HVS) model for the colors of the projector,
 the controller configured to:
  control the projector to project the colors;
  control the camera to acquire respective images of the colors projected by the projector;
  determine a per-pixel correction function for modifying image data used by the projector to project the images, based on:
   the respective images of each of the colors acquired by the camera corrected into the HVS model using the predetermined color-relationship between the camera and the HVS model for the colors of the projector;
  control the projector to project the images using the image data as corrected using the per-pixel correction function; and
  apply one or more of a look-up table (LUT) and a mathematical function to linearize the images when controlling the projector to project the images using the image data as corrected using the per-pixel correction function.

2. The device of claim 1, wherein the projector is configured to project onto a non-white surface located in the common field of view.

3. The device of claim 1, wherein the projector is set to a target white point prior to projecting the colors in a determination of the per-pixel correction function.

4. The device of claim 1, wherein the controller is further configured to: control the projector to project the colors in association with using structured light to determine a geometry-relationship between the projector and camera.

5. The device of claim 1, wherein the projector comprises a 1-chip projector.

6. The device of claim 1, wherein the colors comprise one or more of: primary colors; and red, green and blue.

7. The device of claim 1, wherein the per-pixel correction function includes an ambient light correction factor.

8. The device of claim 1, wherein the HVS model comprises a 1931 CIE (International Commission on Illumination) color space model.

9. A method comprising:
 controlling, using a controller, a projector to project colors, the projector configured to project images according to the colors of the projector;
 controlling, using the controller, a camera to acquire respective images of the colors projected by the projector, the camera and the projector having a common field of view;
 determining, using the controller, a per-pixel correction function for modifying image data used by the projector to project the images, based on:
  the respective images of each of the colors acquired by the camera corrected into a Human Visual System (HVS) model using a predetermined color-relationship between the camera and (the HVS model for the colors of the projector, the controller in communication with a memory storing the predetermined color-relationship;
 controlling, using the controller, the projector to provide the images using the image data as corrected using the per-pixel correction function; and
 applying one or more of a look-up table (LUT) and a mathematical function to linearize the images when controlling the projector to project the images using the image data as corrected using the per-pixel correction function.

10. The method of claim 9, wherein the projector is configured to project onto a non-white surface located in the common field of view.

11. The method of claim 9, wherein the projector is set to a target white point prior to projecting the colors in a determination of the per-pixel correction function.

12. The method of claim 9, further comprising: controlling, using the controller, the projector to project the colors in association with using structured light to determine a geometry-relationship between the projector and camera.

13. The method of claim 9, wherein the projector comprises a 1-chip projector.

14. The method of claim 9, wherein the colors comprise one or more of: primary colors; and red, green and blue.

15. The method of claim 9, wherein the per-pixel correction function includes an ambient light correction factor.

16. The method of claim 9, wherein the HVS model comprises a 1931 CIE (International Commission on Illumination) color space model.

17. A device comprising:
 a controller in communication with:
  a light emitting diode (LED) display configured to provide images according to colors of the LED display; and
  a camera arranged to detect one or more of the images and the colors provided by the LED display; and
  a memory storing: a predetermined color-relationship between the camera and a human visual system (HVS) model for the colors of the LED display,
 the controller configured to:
  control the LED display to provide the colors;
  control the camera to acquire respective images of the colors provided by the LED display;
  determine a per-pixel correction function for modifying image data used by the LED display to provide the images, based on:
   the respective images of each of the colors acquired by the camera corrected into the HVS model using the predetermined color-relationship between the camera and the HVS model for the colors of the LED display;
  control the LED display to provide the images using the image data as corrected using the per-pixel correction function; and apply one or more of a look-up table (LUT) and a mathematical function to linearize the images when controlling the LED display to provide the images using the image data as corrected using the per-pixel correction function.

\* \* \* \* \*